United States Patent
Kneckt et al.

(10) Patent No.: US 12,507,229 B2
(45) Date of Patent: Dec. 23, 2025

(54) WLAN ENHANCEMENTS FOR CO-EXISTENCE

(71) Applicant: Apple Inc., Cupertino, CA (US)

(72) Inventors: Jarkko L Kneckt, Los Gatos, CA (US); Yong Liu, Campbell, CA (US); Yoel Boger, Shoham (IL); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 358 days.

(21) Appl. No.: 18/191,662

(22) Filed: Mar. 28, 2023

(65) Prior Publication Data

US 2023/0354299 A1    Nov. 2, 2023

Related U.S. Application Data

(60) Provisional application No. 63/327,212, filed on Apr. 4, 2022.

(51) Int. Cl.

| | |
|---|---|
| *H04W 72/12* | (2023.01) |
| *H04L 5/00* | (2006.01) |
| *H04W 28/02* | (2009.01) |
| *H04W 28/06* | (2009.01) |
| *H04W 72/50* | (2023.01) |
| *H04L 1/00* | (2006.01) |
| *H04W 84/12* | (2009.01) |

(52) U.S. Cl.
CPC ....... *H04W 72/1215* (2013.01); *H04L 5/0053* (2013.01); *H04W 28/0278* (2013.01); *H04W 28/06* (2013.01); *H04W 72/535* (2023.01); *H04L 1/0003* (2013.01); *H04W 84/12* (2013.01)

(58) Field of Classification Search
CPC . H04W 84/12; H04W 28/06; H04W 28/0278; H04W 72/535; H04W 72/1215; H04L 1/0003; H04L 5/0053
See application file for complete search history.

(56) References Cited

U.S. PATENT DOCUMENTS

| | | | |
|---|---|---|---|
| 6,707,799 B1 * | 3/2004 | Chui | H04L 47/10 370/468 |
| 2005/0157660 A1 * | 7/2005 | Mandato | H04L 69/24 370/254 |

(Continued)

FOREIGN PATENT DOCUMENTS

| | | |
|---|---|---|
| WO | 2016175561 | 11/2016 |

OTHER PUBLICATIONS

Office Action for IN Patent Application No. 202314024720; Sep. 2, 2024.

*Primary Examiner* — Ajay Cattungal
(74) *Attorney, Agent, or Firm* — Kowert, Hood, Munyon, Rankin & Goetzel, P.C.

(57) ABSTRACT

Systems, methods, and mechanisms for WLAN enhancements to facilitate co-existence with other radio access technologies, such as Bluetooth, 5G NR, and/or UWB. For example, WLAN transmissions may be shortened, e.g., to better fit within available transmission times. A wireless device may shorten WLAN transmissions of a peer device by specifying a frame size limitation for WLAN communications. The frame size limitation may be indicated via a data frame, a management frame, a beacon frame, an association request frame, and/or an association response frame.

20 Claims, 15 Drawing Sheets

(56) References Cited

U.S. PATENT DOCUMENTS

| | | | |
|---|---|---|---|
| 2005/0190695 A1* | 9/2005 | Phaal | H04L 43/065 |
| | | | 370/229 |
| 2015/0019432 A1* | 1/2015 | Burns | G06Q 20/3276 |
| | | | 705/44 |
| 2015/0046465 A1* | 2/2015 | Lambert | G16H 70/60 |
| | | | 506/7 |
| 2015/0281753 A1* | 10/2015 | Salama | H04L 43/0823 |
| | | | 725/109 |
| 2016/0087700 A1 | 3/2016 | Chu | |
| 2018/0035426 A1* | 2/2018 | Barriac | H04L 5/0055 |
| 2018/0160384 A1* | 6/2018 | Su | H04W 72/1215 |
| 2019/0261007 A1* | 8/2019 | Emmanuel | H04L 65/65 |
| 2021/0153273 A1* | 5/2021 | Qi | H04W 8/005 |

\* cited by examiner

| Frame Control | Duration/ ID | Address 1 | Address 2 | Address 3 | Sequence Control | Address 4 | QoS Control | A-Control | CCMP Header | MPDU | FCS |

*FIG. 4*

| RTS Needed | Direction | Maximum PPDU Size Exponent | Minimum MCS Rate | Maximum TXOP Duration | Minimum TXOP Interval |

*FIG. 5*

| Element | Length | Element ID Extension | Control Parameters | Minimum MCS Rate | Maximum TXOP Duration |

FIG. 9

| RTS Needed | Direction | Minimum TXOP Interval | Maximum PPDU size exponent |

FIG. 10

| Element | Length | Element ID Extension | Link ID bitmap |

FIG. 11

| Element ID | Length | Element ID Extension | Multi-link Control | Common Information | Link Information |
|---|---|---|---|---|---|

FIG. 15

| Subelement ID | Length | STA Control | STA Info | STA Profile |
|---|---|---|---|---|

FIG. 16

| RTS Needed | Direction | Maximum PPDU Size Exponent | Minimum MCS Rate | Maximum TXOP Duration | Minimum TXOP Interval |
|---|---|---|---|---|---|

FIG. 17

WLAN ENHANCEMENTS FOR CO-EXISTENCE

PRIORITY DATA

This application claims benefit of priority to U.S. Provisional Application Ser. No. 63/327,212, titled "WLAN Enhancements for Co-existence", filed Apr. 4, 2022, which is hereby incorporated by reference in its entirety as though fully and completely set forth herein.

FIELD

The present application relates to wireless communications, including techniques for WLAN enhancements to facilitate co-existence with other radio access technologies, such as Bluetooth.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

SUMMARY

Embodiments described herein relate to systems and methods WLAN enhancements to facilitate co-existence with other radio access technologies, such as Bluetooth.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. In addition, at least one radio is configured to perform communications according to another radio access technology, such as Bluetooth, 5G NR, and/or ultra-wideband (UWB). In some instances, a radio may be shared between multiple radio access technologies. The wireless station may perform voice and/or data communications, as well as any or all of the methods described herein.

Some embodiments relate to an access point that includes one or more antennas, one or more radios, and one or more processors coupled (directly or indirectly) to the radios. At least one radio is configured to perform Wi-Fi communications, e.g., via a Wi-Fi interface. In addition, at least one radio is configured to perform communications according to another radio access technology, such as Bluetooth, 5G NR, and/or UWB. In some instances, a radio may be shared between multiple radio access technologies. The access point may perform voice and/or data communications, as well as any or all of the methods described herein.

In some embodiments, WLAN enhancements may be introduced to facilitate co-existence with other radio access technologies, such as Bluetooth, 5G NR, and/or UWB. For example, embodiments described herein may shorten WLAN transmissions, e.g., to better fit within available transmission times. As another example, embodiments described herein may allow a wireless device to shorten WLAN transmissions of a peer device, e.g., such as another wireless device or access point. Further, embodiments described herein may allow WLAN transmissions to be more compatible with concurrently ongoing Bluetooth transmissions, 5G NR transmissions, UWB ranging transmission, and so forth. In some embodiments, a wireless station may request shorter transmissions from a peer device to alleviate and/or mitigate co-existence issues between radio access technologies. In some embodiments, a wireless station may control usage of ready-to-send (RTS) frames and clear-to-send (CTS) frames prior to transmissions.

In some embodiments, signaling between wireless stations (e.g., between peer wireless stations and/or between a wireless station and an access point) may be introduced to signal frame size limitations. For example, a management frame may be introduced to carry and/or indicate frame size limitation parameters. The management frame may carry multi-link signaling, e.g., a management frame may define frame size limitations for all links and/or multiple links of a multi-link topography, and may not have a limitation of frame size. As another example, a field may be introduced and/or added to a MAC header of a data frame to carry and/or indicate frame size limitation parameters. As further examples, a field may be introduced in a beacon frame, an association request frame, and/or an association response frame to carry and/or indicate frame size limitation parameters.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4 illustrates an example of a data frame with a parameter indicating frame size limitations, according some embodiments.

FIG. 5 illustrates an example of a parameter indicating frame size limitations, according to some embodiments.

FIG. 9 illustrates an example of a management frame used to carry and/or indicate frame size limitation parameters, according to some embodiments.

FIG. 10 illustrates a control parameters field of a management frame used to carry and/or indicate frame size limitation parameters, according to some embodiments.

FIG. 11 illustrates another field of a management frame used to carry and/or indicate frame size limitation parameters, according to some embodiments.

FIG. 15 illustrates an example of a multi-link element, according to some embodiments.

FIG. 16 illustrates an example of a per station profile field, according to some embodiments.

FIG. 17 illustrates an example of a station control field, according to some embodiments.

Figure 1:
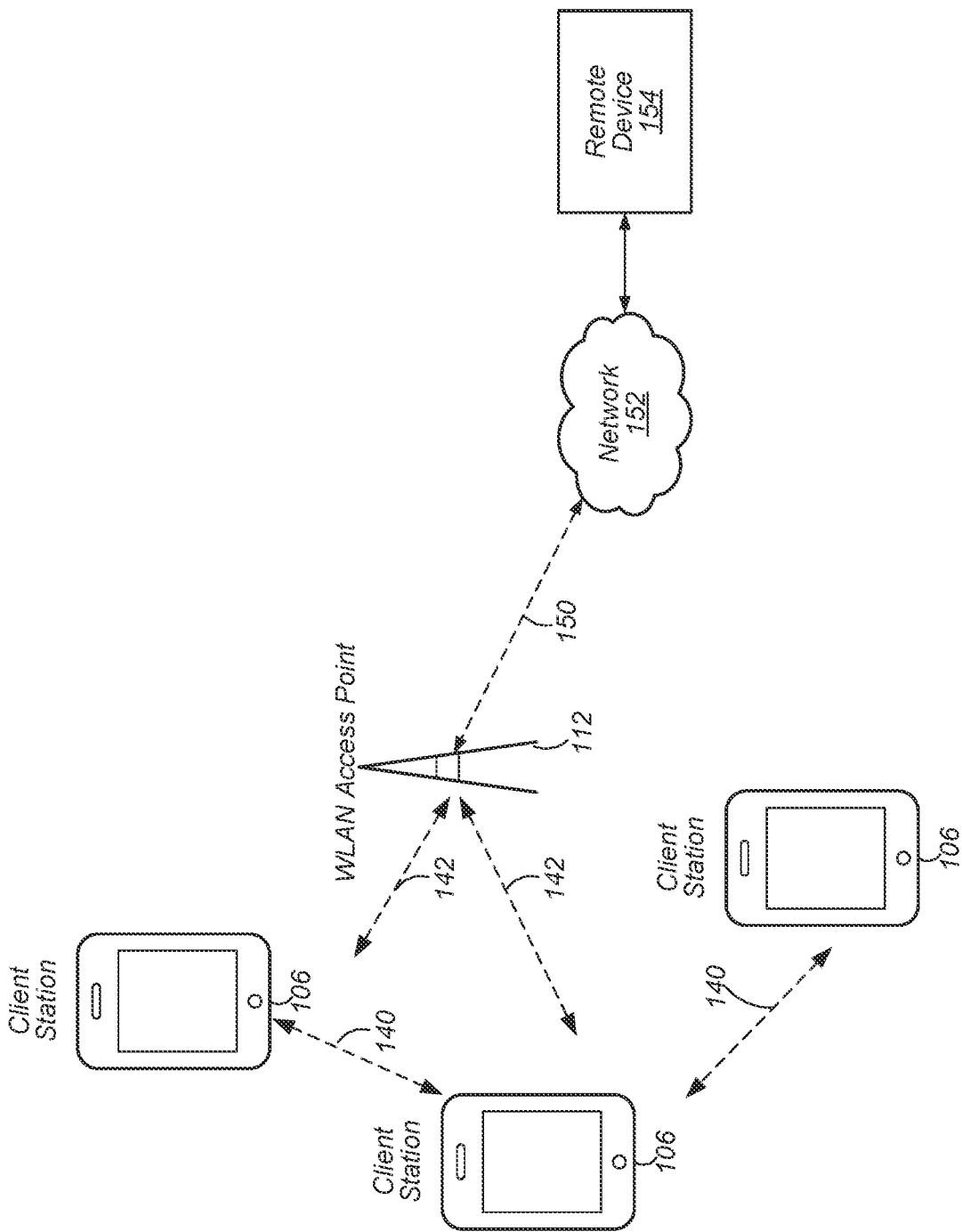
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™ etc. Various other types of devices would fall into this category if they include Wi-Fi or both cellular and Wi-Fi communication capabilities, such as laptop computers (e.g., MacBook™) portable gaming devices (e.g., Nintendo DS™, PlayStation Portable™, Gameboy Advance™ iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™ Amazon FireTV™, Google Chromecast™, etc.), refrigerators, laundry machines, thermostats, and so forth.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short-range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods WLAN enhancements to facilitate co-existence with other radio access technologies, such as Bluetooth.

Figure 2:
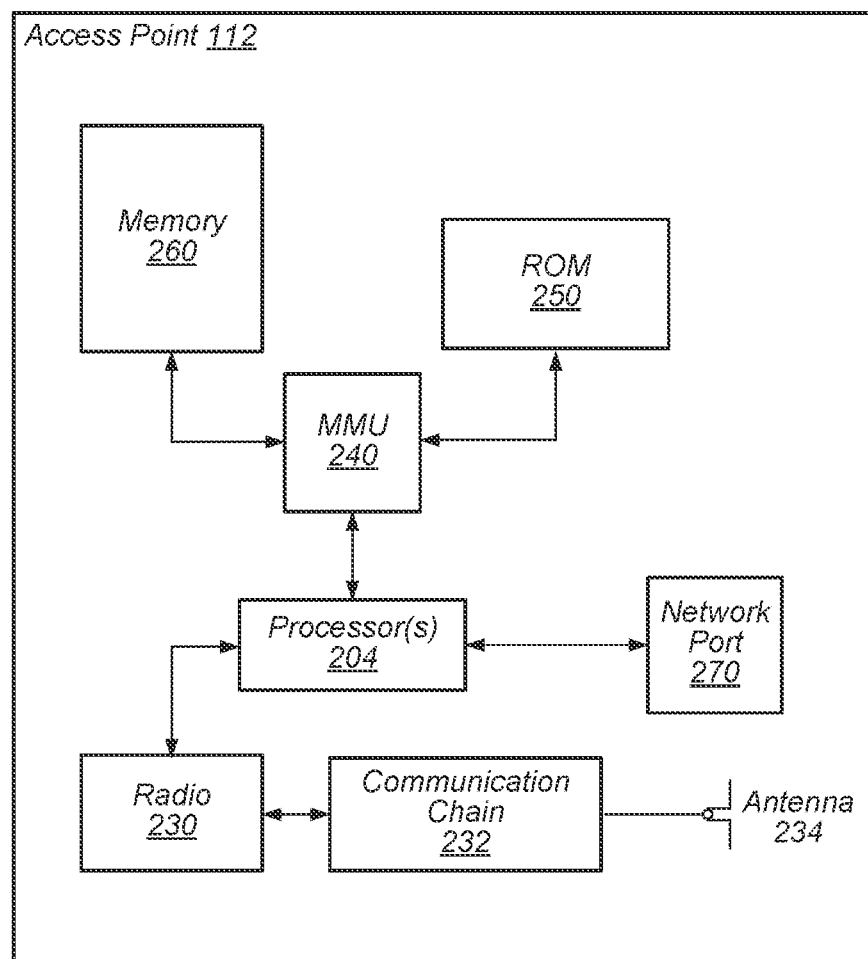
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Figure 3:
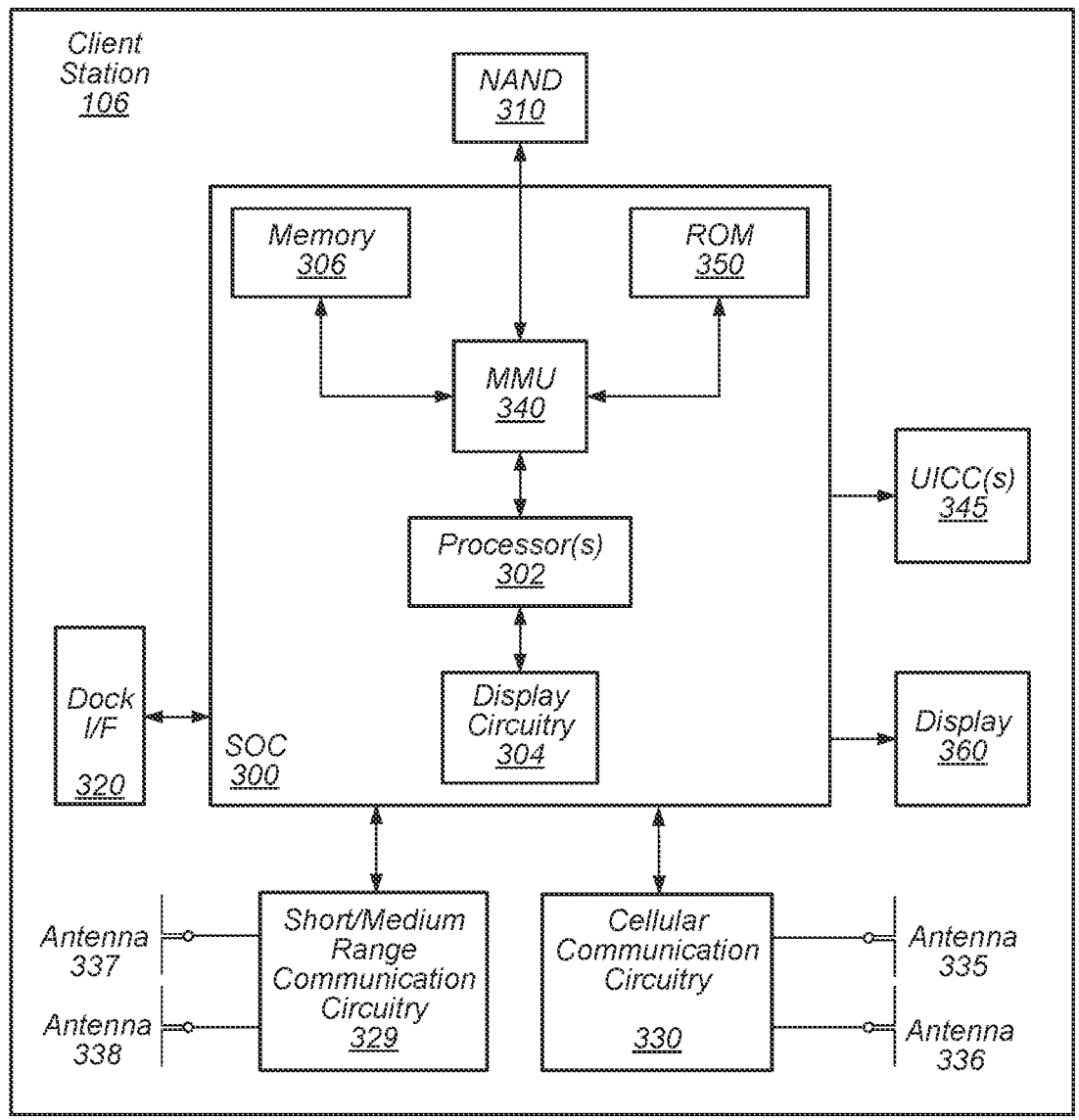
FIG. 3 illustrates an example simplified block diagram of a mobile station, according to some embodiments.

In some embodiments, as further described below, AP 112 may be configured to perform methods for a privacy enhanced BSS, including privacy enhancements for both access points and wireless stations as well as privacy enchantments for authentication, association, and discovery operations FIG. 3—Client Station Block Diagram FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash memory 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods WLAN enhancements to facilitate co-existence with other radio access technologies, such as Bluetooth.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

WLAN Enhancements for Co-Existence

In current implementations, Bluetooth communications operate in a 2.4 GHz band shared with wireless local area networks (WLANs) (e.g., such as Wi-Fi). However, in future implementations, Bluetooth communications are planned for operation in a 5 GHz band (also shared with Wi-Fi) as well as a 6 GHz band. Bluetooth radios transmit and receive packets using a periodic schedule based on transmission intervals and transmission durations. Further, since Bluetooth and WLANs at least partially operate in the 2.4 GHz frequency band, devices typically share a radio between Bluetooth and WLAN transmissions. Thus, such a device may by capable of performing a Bluetooth communication (e.g., transmission or reception) or a WLAN communication at any given time. Similarly, even if a device has dedicated radios for Bluetooth and WLAN communications, simultaneous transmissions by the dedicated radios may corrupt (e.g., interfere) with the Bluetooth transmissions. Additionally, interference from a Bluetooth transmission may prevent simultaneous reception of a WLAN transmission.

In current implementations, a WLAN transmission duration, e.g., a duration of a physical layer protocol data unit (PPDU) may be determined based, at least in part, on frame size, frame transmission rate, PPDU headers overhead size, e.g., as shown by equation [1].

$$\text{PPDU Duration} = \text{Frame size/Frame Transmission Rate} + \text{PPDU heades overhead} \quad [1]$$

The frame size may depend on payload, a number of MAC PDUs (MPDUs), MPDU size and possible end of frame (EoF) padding, where the frame size may be limited by a number of MPDUs in an aggregated MPDU (A-MPDU), MPDU size, and/or whether aggregated MAC service data unit (A-MSDU) is supported. Further, the frame transmission rate (e.g., transmission rate of a payload) may be selected by a transmitter based on the transmitter's rate adaptation logic or may be defined by an access point for triggered uplink transmissions. In addition, a PPDU preamble may be a fixed duration (e.g., within a range of 20 to 50 microseconds) and may depend on a PPDU type.

Additionally, a wireless station may use various mechanisms to adjust a WLAN transmission size and/or duration. For example, a wireless station may adjust a WLAN transmission size and/or duration by adjusting a block acknowledgment (BA) window size, supporting MSDU aggregation (A-MSDU), and/or by adjusting a maximum A-MPDU size. However, each of these mechanisms have limitations and/or drawbacks.

For example, a BA window size may limit a size of transmitted physical layer PDUs (PPDUs) but adjusting BA window size across multiple traffic identifiers (TIDs) may prohibitively increase signaling and overhead. Note that an A-MPDU, as defined by IEEE 802.11n, may include multiple MPDUs and a BA frame, also defined by IEEE 802.11n, may acknowledge each MPDU in an A-MPDU separately. Note further that an MPDU has a sequence number (SN) and frame control sequence (FCS). Thus, a receiving may calculate FCS on a received frame and check whether the calculated FCS matches an FCS of an MPDU. Additionally, a BA has a window size that defines a number of SNs a receiver is capable of acknowledging. Hence, transmitted A-MPDUs should have SNs that fit within a BA window. As such, a BA window size may limit a size of transmitted PPDUs. For example, as BA window size is decreased, a number of MPDUs in a PPDU is correspondingly decrease. Hence, decreasing BA window size limits the number of MPDUs in a PPDU. However, a BA is both directional and TID dependent. Thus, BA setup is performed by a transmitter separately for each TID. As an example, if communicating wireless stations use all TIDs to transmit traffic, there needs to be 16 BA terminations and setups to change all TIDs to operate with smaller (shorter) MPDU sizes. Further, each BA termination and setup requires 3 management frames that are transmitted separately and acknowledged with an acknowledgement frame, resulting in transmission of 48 management frames and 48 acknowledgement frames to adjust BA window size to control WLAN transmission size and/or duration. Therefore, such mass signaling may lead to increased overhead and delays.

As further examples, supporting A-MSDU and/or adjusting a maximum A-MPDU size may limit a WLAN transmission size and/or duration, however, neither mechanism is particularly efficient since A-MSDU support and maximum A-MPDU size are signaled during association. Thus, to change either parameter, a wireless station needs to re-associate with the peer device (either another wireless station or access point). Further, re-association deletes all BAs and traffic quality-of-service (QoS) signaling, leading to higher overhead and increased signaling. In addition, supported maximum A-MPDU sizes may be too large to efficiently limit PPDU duration (e.g., WLAN transmission size and/or duration).

Embodiments described herein provide systems, methods, and mechanisms for WLAN enhancements to facilitate co-existence with other radio access technologies, such as Bluetooth. For example, embodiments described herein may provide systems, methods, and mechanisms to shorten WLAN transmissions, e.g., to better fit within available transmission times. As another example, embodiments described herein may provide systems, methods, and mechanisms to allow a wireless device to shorten WLAN transmissions of a peer device, e.g., such as another wireless device or access point. Further, embodiments described herein may provide systems, methods, and mechanisms to allow WLAN transmissions to be more compatible with concurrently ongoing Bluetooth transmissions, 5G NR transmissions, ultra-wideband (UWB) ranging transmission, and so forth. In some embodiments, a wireless station, such as wireless station 106, may request shorter transmissions from a peer device (e.g., another wireless station or an access point) to alleviate and/or mitigate co-existence issues between radio access technologies. In some embodiments, a wireless station, such as wireless station 106, may control usage of ready-to-send (RTS) frames and clear-to-send (CTS) frames prior to transmissions. Note that the embodiments described herein may allow for lower overhead as compared to current solutions as well as rapid deployment. Note further that the embodiments described herein may be used in all WLAN topologies.

In some instances, signaling between wireless stations (e.g., between peer wireless stations 106 and/or between a wireless station 106 and an access point 112) may be introduced to signal frame size limitations. For example, a management frame may be introduced to carry and/or indicate frame size limitation parameters. The management frame may carry multi-link signaling, e.g., a management frame may define frame size limitations for all links and/or multiple links of a multi-link topography, and may not have a limitation of frame size. As another example, a field may be introduced and/or added to a MAC header of a data frame to carry and/or indicate frame size limitation parameters. In some instances, the field may be limited to 29 bits. In some instances, a beacon frame may be used to carry and/or indicate frame size limitation parameters. In some instances, the signaling may be unicast signaling and/or broadcast signaling. As an example, unicast signaling may be acknowledged by a receiver and field size limitation parameters may only apply to the receiver. As another example, broadcast signaling may set frame size limitation parameters for all receivers, e.g., a wireless station, such as a mobile access point, may limit frame size for all associated wireless stations. In some instances, field size limitations may have an effective time based, at least in part, on whether the field size is increased (e.g., field size limitations relaxed) or decreased (e.g., field size limitations become stricter). For example, if the signaling relaxes field size limitations, new field size limitations mays not be adopted as quickly as compared to the signaling further restricting field size limitations. As another example, if the signaling further restricts field size limitations, than a peer wireless station may adopt new field size limitations within a reasonable time, e.g., within a beacon interval.

Figure 6:
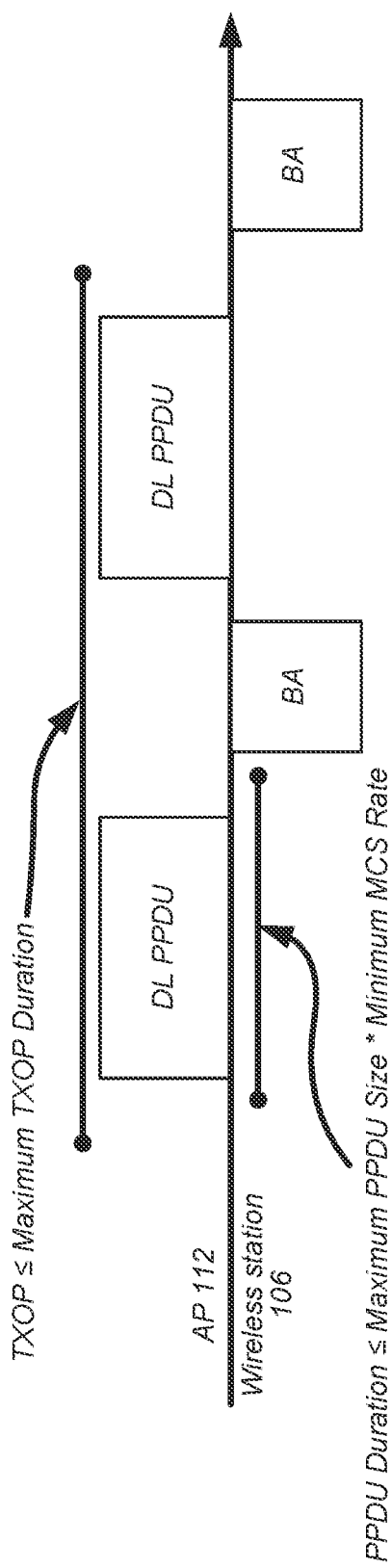
FIG. 6 illustrates an example of an access point using a longer TXOP but limiting a time that is used to transmit to a wireless station to adhere to a maximum TXOP duration limit indicated by the wireless station, according to some embodiments.

For example, FIG. 4 illustrates an example of a data frame with a parameter (e.g., an A-control field) indicating frame size limitations, according some embodiments. As shown a data frame may include a frame control field, a duration/ID field, multiple address fields (e.g., address fields 1, 2, 3, and 4), a sequence control field, a QoS control field, an A-control field, a Counter Mode CBC-MAC Protocol (CCMP) header field, an MPDU field, and/or an FCS field. As shown in FIG. 5, an A-control field, e.g., a parameter indicating frame size limitations, may include an RTS needed field, a direction field, a maximum PPDU size exponent field, a minimum modulation and coding scheme (MCS) rate field, a maximum transmit opportunity (TXOP) duration field, and/or a minimum TXOP interval field. Note that each field may include parameters that act to control/limit frame size for transmissions to a wireless station, such as wireless station 106. Thus, if multiple limits are set, then all conditions must be met, e.g., the strictest limitations are applied. For example, as shown in FIG. 6, an access point, such as access point 112, may use a longer TXOP but limit a time that is used to transmit to a wireless station, such as wireless station 106, to adhere to a maximum TXOP duration limit indicated by the wireless station.

Figure 7:
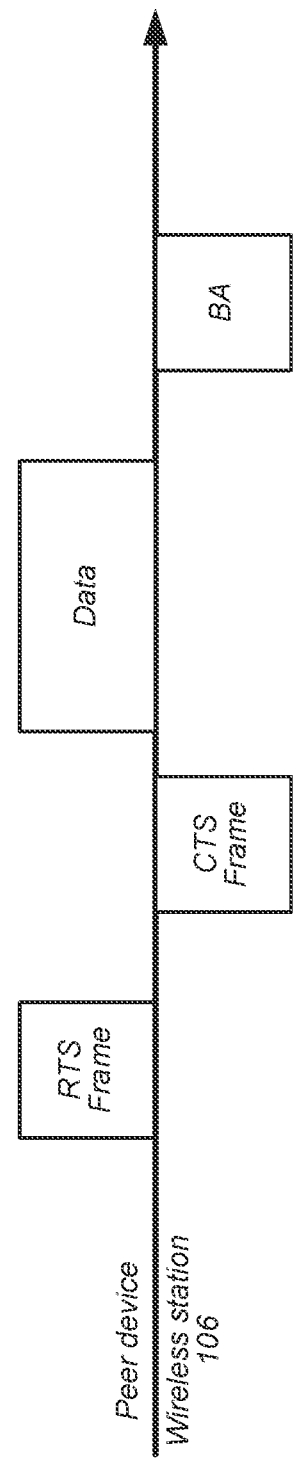
FIG. 7 illustrates an example of signaling when a wireless station indicates an RTS frame is required, according so some embodiments.

The RTS needed field may be 1 bit. The RTS needed field may indicate whether a wireless station requires a peer device to send an RTS frame (e.g., an RTS frame, a multi-user RTS frame, and/or a buffer status report poll (BSRP) frame) before the peer device may send a data frame or a management frame. For example, a value of 1 may indicate a wireless station requires a peer device to send an RTS frame (e.g., an RTS frame, a multi-user RTS frame, and/or a buffer status report poll (BSRP) frame) before the peer device may send a data frame or a management frame and a value of 0 may indicate that such a frame is not required before the peer device may send a data frame or a management frame. Alternatively, a value of 0 may indicate a wireless station requires a peer device to send an RTS frame (e.g., an RTS frame, a multi-user RTS frame, and/or a buffer status report poll (BSRP) frame) before the peer device may send a data frame or a management frame and a value of 1 may indicate that such a frame is not required before the peer device may send a data frame or a management frame. FIG. 7 illustrates an example of signaling when a wireless station indicated an RTS frame is required, according so some embodiments. As shown, when a wireless station, such wireless station 106, indicates via an RTS needed field of an A-control field included in a data frame, e.g., as described in reference to FIGS. 4 and 5, that a peer device is required to send an RTS/MU-RTS/BSRP) frame, e.g., that the peer device is required to initiate signaling, prior to transmission of data (e.g., data frame(s)) or a management frame, the peer device may send a frame (e.g., an RTS/MU-RTS/BSRP frame) to initiate communications. The wireless station may then check whether there is suitable time to send the data, e.g., based on WLAN co-existence with other RATs. Note that the wireless station may not respond if, for example, a Bluetooth (or other RAT)

transmission/interruption would fail the peer transmission. Thus, in such instances, only the initiation signaling time is wasted leading to a reduction in wasted resources. Further, when the wireless station determines there is suitable time to send the data, the wireless station may respond with a CTS frame. The peer device may then transmit the data and the wireless station may respond with a BA, as shown.

The direction field may be 1 bit. The direction field may indicate uplink triggered transmission or downlink transmission. In other words, the direction field may signal whether settings are defined for downlink transmission or for uplink triggered transmissions. For example, a first value may define that Transmission Control field parameters control peer device transmissions to a wireless station. A second value may then define that Transmission Control field parameters control a wireless station's transmissions that are triggered by a peer device. Note that downlink frames (e.g., to a peer device) and uplink triggered frames (e.g., from a peer device) may have different limitation parameter values. In addition, if a peer device is not capable off triggering a wireless station, the peer device may use a Multi-User Enhanced Distributed Control Access (EDCA) Reset frame to allow the peer STA to use EDCA parameters. Further, if a peer device triggers a wireless station "poorly", the wireless station may disable triggering by using an Operating Mode Indication A-Control field.

The maximum PPDU size exponent field may be 4 bits. The maximum PPDU size exponent field may specify the exponent is octets. The maximum PPDU size exponent field may limit a PPDU size as defined by equation [2].

$$\text{MAX PPDU Size} = 2^{(6+\textit{Maximum PPDU size exponent})} \quad [2]$$

A value of 15 may indicate that a wireless station's physical version specific capabilities limit PPDU size.

The minimum MCS rate field may be 8 bits. The minimum MCS rate field may be specified as megabytes per second. The minimum MCS rate field may define a minimum transmission rate that may be used. A value of 0 may indicate that any MCS rate may be used. Note that the Minimum MCS rate may be configured to ensure that a peer device does not drop transmission rate unnecessary low. For example, co-existence issues (e.g., from Bluetooth transmissions/interrupts) may be a reason for poor frames reception, but the peer device think that erroneous transmissions are caused by a poor link and, thus, move to lower MCS rate. However, poor (e.g., lower) MCS may result in poorer (e.g., decreased) co-existence performance because transmissions require a longer duration. Thus, by setting a minimum MCS rate, a wireless station may avoid such degradations.

Figure 8:
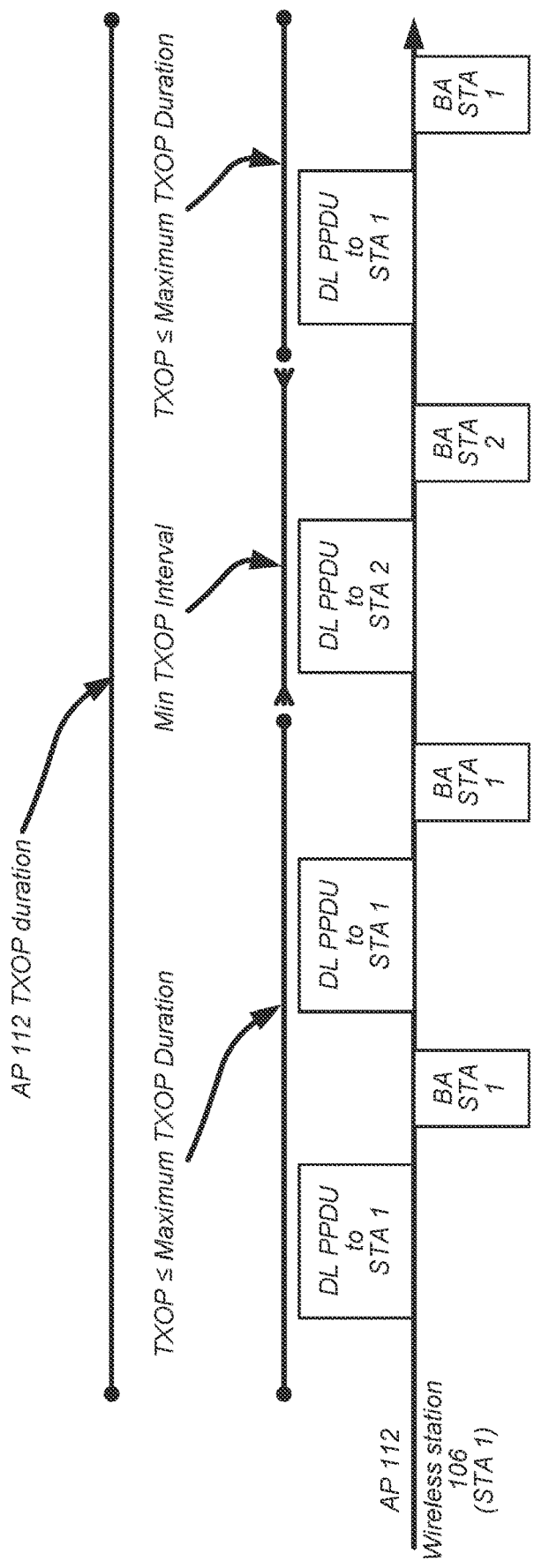
FIG. 8 illustrates an example of a peer device transmitting multiple times to a wireless station during a longer TXOP while adhering to a minimum TXOP interval indicated by the wireless station, according to some embodiments.

The maximum TXOP duration field may be 8 bits. The maximum TXOP duration field may specify TXOP duration in increments of 25 microseconds. A value of 0 may indicate PPDU duration (e.g., TXOP duration) is not limited. The maximum TXOP duration field may define a maximum TXOP duration that a peer device may use to transmit to a wireless station. Note, in some instances, a peer device, e.g., such as AP 112, may use longer TXOPs, but limit a time that it uses to transmit to a wireless station, such as wireless station 106, within the Maximum TXOP Duration limit. Thus, AP 112 may send within a TXOP to multiple wireless stations, but limit transmissions to wireless station 106 to occur only during the specified Maximum TXOP Duration interval. Further, in some instances, e.g., as illustrated by FIG. 8, if a peer device, such as AP 112, has longer TXOPs, the peer device may transmit multiple times to a wireless station during a longer TXOP. Note, as shown, the peer device may still adhere to a minimum TXOP interval indicated by the wireless station. Further, as shown, the peer device (e.g., AP 112) may transmit to another wireless station (e.g., STA 2) during an interval between transmissions to the wireless station (e.g., STA 1).

The minimum TXOP interval field may be 2 bits. The minimum TXOP interval field may specify how a peer device may continue transmission in a next TXOP. For example, a first value may indicate that transmission may be continued after EDCA TXOP obtaining. As another example, a second value may indicate that transmission may be continued after EDCA TXOP obtaining or after one or more PPDUs are addressed to other wireless stations. As a further example, a third value may indicate that transmission may be continued after EDCA TXOP obtaining or after two or more PPDUs are addressed to other wireless stations. Note that a fourth value may be reserved. Note that acknowledgement frames, if present, as well as other immediate control response frames, may not be counted as a PPDU. In some instances, the first value may correspond to a parameter value of "00", the second value may correspond to a parameter value of "01", the third value may correspond to a parameter value of "10", and the fourth value may correspond to a parameter value of "11".

In some instances, a parameter (e.g., an A-control field) indicating frame size limitations may control access point (AP) triggering. For example, the parameter may control a duration of triggered high efficiency trigger based (HE TB) PPDUs. Additionally, the minimum MCS rate field may indicate a minimum rate of allocated resource units. Further, the access point may not allocate a resource unit that is larger than indicated by the maximum PPDU size exponent. Thus, through these various parameters, a wireless station, such as wireless station 106, may control access point triggering.

In some instances, a management frame may be used to carry and/or indicate frame size limitation parameters. The management frame be used as a unicast transmission or a broadcast transmission. In some instances, the management frame may be transmitted multiple times, e.g., to ensure reception by peer devices. In some instances, a multi-link device (MLD) may broadcast the management frame to each of its links. Further, the management frame may be transmitted at times when buffered broadcast data is transmitted, e.g., after a Delivery Traffic Indication Message (DTIM) beacon frame.

FIG. 9 illustrates an example of a management frame used to carry and/or indicate frame size limitation parameters, according to some embodiments. The management frame may be a peer transmissions control management frame. As shown, the management frame may include an element field, a length field, an element ID extension field, a control parameters field, a minimum MCS rate field, and/or a maximum TXOP duration field. As described above, the minimum MCS rate field may be specified as megabytes per second. The minimum MCS rate field may define a minimum transmission rate that may be used. A value of 0 may indicate that any MCS rate may be used. Note that the Minimum MCS rate may be configured to ensure that a peer device does not drop transmission rate unnecessary low. For example, co-existence issues (e.g., from Bluetooth transmissions/interrupts) may be a reason for poor frames reception, but the peer device think that erroneous transmissions are caused by a poor link and, thus, move to lower MCS rate. However, poor (e.g., lower) MCS may result in poorer (e.g., decreased) co-existence performance because transmissions require a longer duration. Thus, by setting a minimum MCS rate, a wireless station may avoid such degradations. The minimum MCS rate field may be 1 octet or 8 bits. In addition, as described above, the maximum TXOP duration field may specify TXOP duration in increments of 25 microseconds. A value of 0 may indicate PPDU duration (e.g., TXOP duration) is not limited. The maximum TXOP duration field may define a maximum TXOP duration that a peer device may use to transmit to a wireless station. Note, in some instances, a peer device, e.g., such as AP 112, may use longer TXOPs, but limit a time that it uses to transmit to a wireless station, such as wireless station 106, within the Maximum TXOP Duration limit. Thus, AP 112 may send within a TXOP to multiple wireless stations, but limit transmissions to wireless station 106 to occur only during the specified Maximum TXOP Duration interval. Further, in some instances, e.g., as illustrated by FIG. 8, if a peer device, such as AP 112, has longer TXOPs, the peer device may transmit multiple times to a wireless station during a longer TXOP. Note, as shown, the peer device may still adhere to a minimum TXOP interval indicated by the wireless station. Further, as shown, the peer device (e.g., AP 112) may transmit to another wireless station (e.g., STA 2) during an interval between transmissions to the wireless station (e.g., STA 1). The maximum TXOP duration field may be 1 octet or 8 bits.

FIG. 10 illustrates a control parameters field of a management frame used to carry and/or indicate frame size limitation parameters, according to some embodiments. The control parameters field may be 1 octet or 8 bits. As shown, the control parameters field may include an RTS needed field, a direction field, a minimum TXOP interval field, and/or a maximum PPDU size exponent field. As described above, the direction field may be 1 bit. The direction field may indicate uplink triggered transmission or downlink transmission. In other words, the direction field may signal whether settings are defined for downlink transmission or for uplink triggered transmissions. For example, a first value may define that Transmission Control field parameters control peer device transmissions to a wireless station. A second value may then define that Transmission Control field parameters control a wireless station's transmissions that are triggered by a peer device. Note that downlink frames (e.g., to a peer device) and uplink triggered frames (e.g., from a peer device) may have different limitation parameter values. In addition, if a peer device is not capable off triggering a wireless station, the peer device may use a Multi-User (MU) Enhanced Distributed Channel Access (EDCA) Reset frame to allow the peer STA to use EDCA parameters instead of MU-EDCA parameters. MU-EDCA parameters typically require a longer duration to obtain transmission opportunities than EDCA parameters. Further, if a peer device triggers a wireless station "poorly", the wireless station may disable triggering by using an Operating Mode Indication A-Control field. In addition, the maximum PPDU size exponent field may be 4 bits. As described above, the maximum PPDU size exponent field may specify the exponent size. The maximum PPDU size exponent field may limit a PPDU size in octets as defined by equation [2]. A value of 15 may indicate that a wireless station's physical version specific capabilities limit PPDU size. The minimum TXOP interval field may be 2 bits. As described above, the minimum TXOP interval field may specify how a peer device may continue transmission in a next TXOP. For example, a first value may indicate that transmission may be continued after EDCA TXOP obtaining. As another example, a second value may indicate that transmission may be continued after EDCA TXOP obtaining or after one or more PPDUs are addressed to other wireless stations. As a further example, a third value may indicate that transmission may be continued after EDCA TXOP obtaining or after two or more PPDUs are addressed to other wireless stations. The acknowledgement frames, if present, as well as other immediate control response frames, may not be counted as a PPDU. Note that a fourth value may be reserved. In some instances, the first value may correspond to a parameter value of "00", the second value may correspond to a parameter value of "01", the third value may correspond to a parameter value of "10", and the fourth value may correspond to a parameter value of "11".

FIG. 11 illustrates another element of a management frame used to carry and/or indicate frame size limitation parameters, according to some embodiments. As shown, this element may include an element field, a length field, an element ID extension field, and/or a link ID bitmap field. The element field may be 1 octet. The length field may be 1 octet. The element ID extension field may be 1 octet. The link ID bitmap field may be 2 octets.

In some instances, a management frame used to carry and/or indicate frame size limitation parameters may include additional elements or fields, such as category and HE action field. In such instances, the category field may be set to a value of 31 to indicate protected HE action. Further, the HE actions field may be set to a value of 2 to indicate a peer transmissions management frame (e.g., a management frame used to carry and/or indicate frame size limitation parameters). Further, within the link ID bitmap field described above, a value of 1 may indicate a corresponding bit position has a peer transmission control element present in the management frame. In other words, the link ID bitmap field may indicate one or more peer transmission control elements are present in the management frame.

Figure 12:
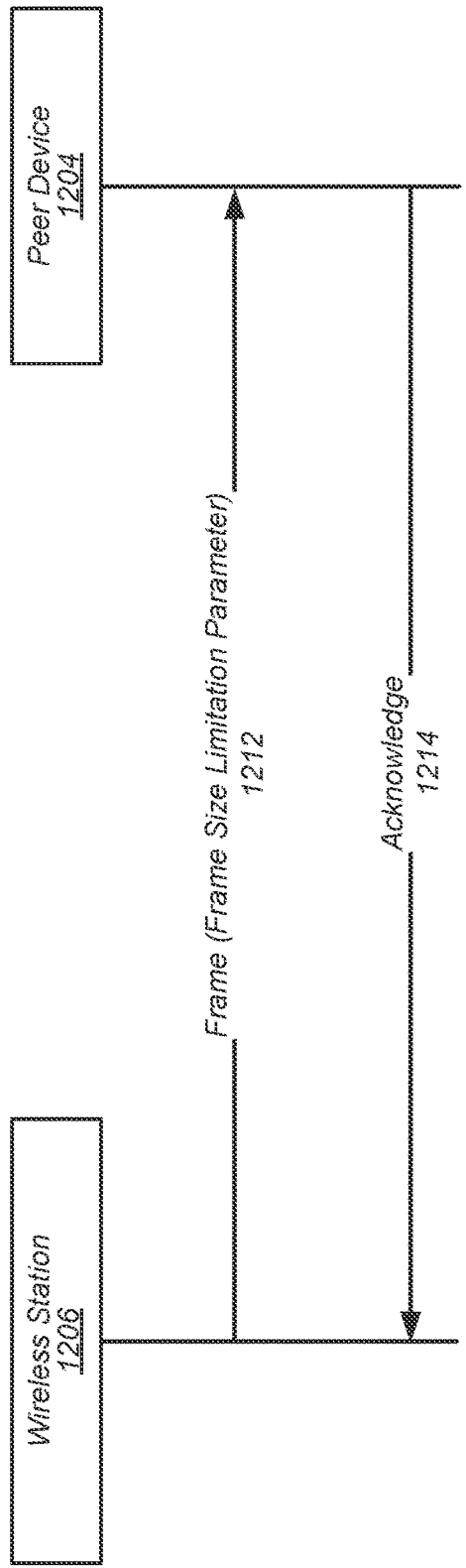
FIG. 12 illustrates an example of signaling in which a wireless station, associated with a peer device, indicates a frame size limitation to the peer device, according to some embodiments.
Figure 13:
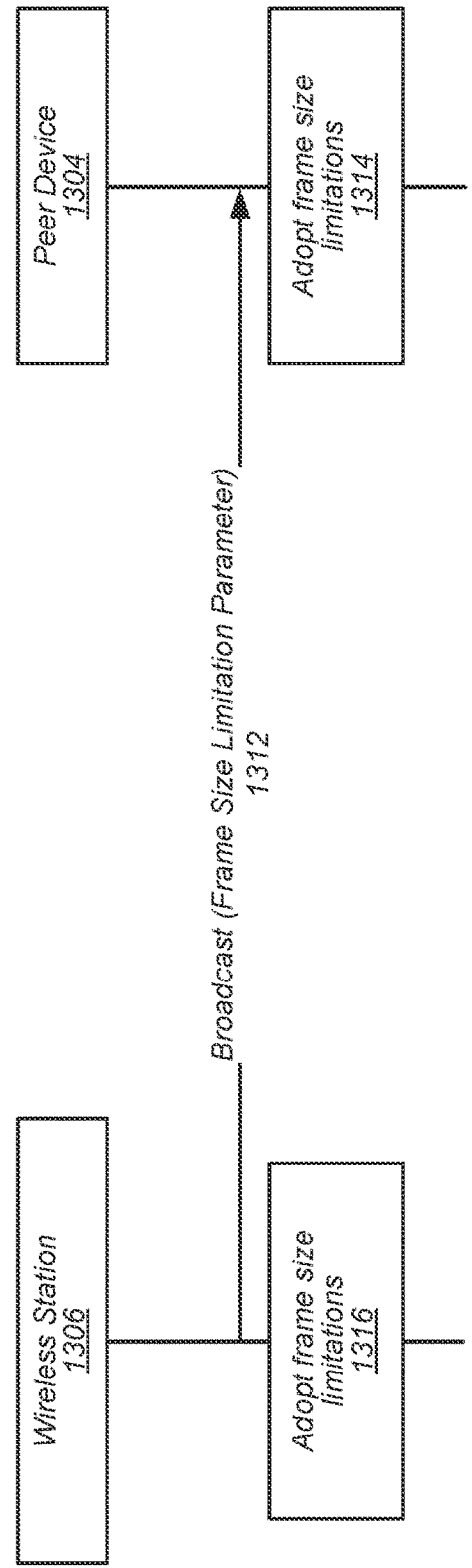
FIG. 13 illustrates an example of signaling in which a wireless station, operating as a mobile access point, indicates a frame size limitation to associated peer devices, according to some embodiments.

As described above, signaling may be introduced between a wireless station 1206/1306, such as wireless station 106, and a peer device 1204/1304, such as another wireless station 106 and/or an access point, such as access point 112, to allow the wireless station to indicate frame size limitations to the peer device. FIGS. 12 and 13 illustrate examples of signaling for a wireless station to indicate frame size limitations to a peer device, according to some embodiments. The signaling shown in FIGS. 12 and 13 may be used in conjunction with any of the systems, methods, or devices shown in the Figures, among other devices. In various embodiments, some of the signaling shown may be performed concurrently, in a different order than shown, or may be omitted. Additional signaling may also be performed as desired.

Turning to FIG. 12, illustrated is an example of signaling in which a wireless station, associated with a peer device, indicates a frame size limitation to the peer device, according to some embodiments. As shown, this signaling may flow as follows. At 1212, the wireless station 1206 may transmit a frame that includes a parameter (e.g., an A-control field or a peer transmissions control element) indicating frame size limitations to the peer device 1204. The frame may be a management frame, a beacon frame, an association request frame, an association response frame, and/or a data frame (e.g., a QoS null frame), e.g., as described herein. At 1214, the peer device 1204 may send an acknowledge the frame. At this point the wireless station 1206 has set a new frame size limitation for transmissions from the peer device 1204. Further, after a time-out period, the peer device 1204 may transmit to the wireless station 1206 only by using the frame size limitations set by the wireless station 1206.

Note that when the parameter (e.g., an A-control field or a peer transmissions control element) indicating frame size limitations is included in a beacon frame, associated peer devices may receive the beacon frame and the frame size limitations may be link specific and the associated peer devices may limit their transmissions according the indicated frame size limitations for their corresponding link to the wireless station. Note further that when parameter (e.g., an A-control field or a peer transmissions control element) indicating frame size limitations is included in an association request frame and/or an association response frame, the wireless station may set frame size limitations from the point of association with the peer device.

Turning to FIG. 13, illustrated is an example signaling in which a wireless station 1306, operating as a mobile access point, indicates a frame size limitation to associated peer devices 1304, according to some embodiments. As shown, this signaling may flow as follows. At 1312, the wireless station 1306 may broadcast a frame that includes a parameter (e.g., an A-control field or a peer transmissions control element) indicating frame size limitations. The broadcast frame may be a management frame, a beacon frame, and/or a data frame (e.g., a QoS null frame), e.g., as described herein. At 1314, upon receipt of the broadcast frame, the peer device 1304 may adopt the frame size limitations indicated by the broadcast frame and the peer device 1304 may transmit to the wireless station 1306 only by using the frame size limitations set by the wireless station 1306. Further, at 1316, the wireless device 1306 may adopt the frame size limitations indicated by the broadcast frame and may transmit to the peer device 1304 only by using the frame size limitations set by the wireless station 1306.

In some instances, frame size limitation control may be coordinated in various WLAN topologies, e.g., such as an infrastructure topology with a MLD access point or a Neighbor Awareness Networking (NAN) (e.g., mesh) topology. Note that the frame size limitation may be set by any device within the WLAN topology and may be on a per link basis.

Figure 14:
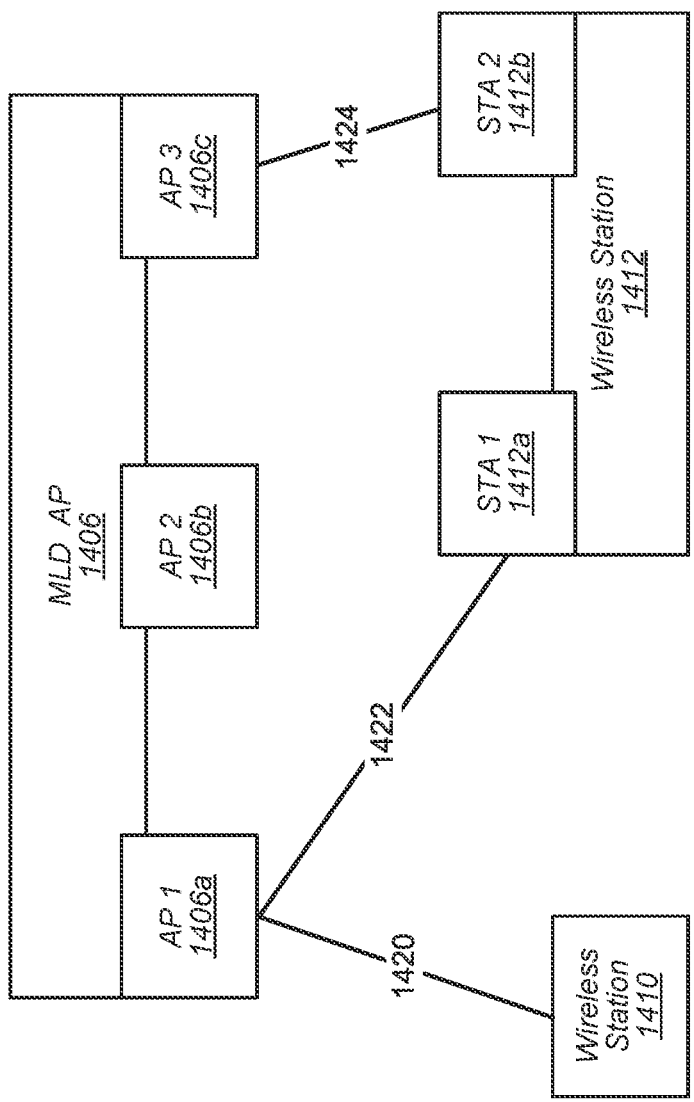
FIG. 14 illustrates an example of an infrastructure topology with an MLD access point, according to some embodiments.

FIG. 14 illustrates an example of an infrastructure topology with a multi-link device (MLD) access point, according to some embodiments. As shown, a MLD access point, such as MLD AP 1406 may host multiple access points, such as AP 1 1406a, AP 2 1406b, and AP 3 1406c. Note that MLD AP 1406 may be a mobile MLD AP, e.g., such as wireless station 106, or a fixed MLD AP, e.g., such as access point 112. MLD AP 1406 may have a link 1420 to a non-MLD wireless station, such as wireless station 1410 (which may be a wireless station 106) and multiple links to an MLD wireless station, such as wireless station 1412 (which may be a wireless station 106). Thus, as shown, wireless multi-link device (MLD) station 1412 may have a link 1422 to MLD AP 1406 between STA 1 1412a and AP 1 1406a as well as a link 1424 between STA 2 1412b and AP 3 1406c. According to embodiments described herein, any of MLD AP 1406, wireless station 1410, and/or wireless station 1412 may set frame size limitations on a per link basis, e.g., by indicating frame size limitations via a management frame, a beacon frame, an association request frame, an association response frame, and/or a data frame (e.g., a QoS null frame), e.g., as described herein.

In some instances, when a MLD wireless station, e.g., such as wireless station 1412 associates with an MLD access point, such as MLD AP 1406, association request and association response frames may specify other links' parameters in a multi-link element, e.g., as illustrated by FIG. 15. As shown, the multi-link element may include an element ID field, a length field, an element ID extension field, a multi-link control field, a common information field, and/or a link information field. As shown, the link information field may include one or more per-station (per-STA) profile fields (e.g., Per-STA Profile X field, Per-STA profile Y field, and so forth) as well as vendor specific information. Further, as illustrated by FIG. 16, a per station profile field may include a subelement ID field, a length field, a station control (STA control) field, a station information (STA Info) field containing various sub-fields, and/or a station profile (STA profile) field containing various sub-fields.

In some instances, for example, as illustrated by FIG. 17, the station control field may include various sub-fields to indicate frame size limitation parameters for a corresponding link, according to some embodiments. As shown, the station control field may include an RTS needed field, a direction field, a maximum PPDU size exponent field, an MCS rate field, a maximum TXOP duration field, and/or a minimum TXOP interval field. Note that each field may include parameters that act to control/limit frame size for transmissions to a wireless station, such as wireless station 106, and/or on a particular link for transmissions to the wireless station.

The RTS needed field may be 1 bit. The RTS needed field may indicate whether a wireless station requires a peer device to send an RTS frame (e.g., an RTS frame, a multi-user RTS frame, and/or a BSRP frame) before the peer device may send a data frame or a management frame. For example, a value of 1 may indicate a wireless station requires a peer device to send an RTS frame (e.g., an RTS frame, a multi-user RTS frame, and/or a buffer status report poll (BSRP) frame) before the peer device may send a data frame or a management frame and a value of 0 may indicate that such a frame is not required before the peer device may send a data frame or a management frame. Alternatively, a value of 0 may indicate a wireless station requires a peer device to send an RTS frame (e.g., an RTS frame, a multi-user RTS frame, and/or a buffer status report poll (BSRP) frame) before the peer device may send a data frame or a management frame and a value of 1 may indicate that such a frame is not required before the peer device may send a data frame or a management frame.

The direction field may be 1 bit. The direction field may indicate uplink triggered transmission or downlink transmission. In other words, the direction field may signal whether settings are defined for downlink transmission or for uplink triggered transmissions. For example, a first value may define that Transmission Control field parameters control peer device transmissions to a wireless station. A second value may then define that Transmission Control field parameters control a wireless station's transmissions that are triggered by a peer device. Note that downlink frames (e.g., to a peer device) and uplink triggered frames (e.g., from a peer device) may have different limitation parameter values. In addition, if a peer device is not capable off triggering a wireless station, the peer device may use an EDCA Management frame to allow the peer STA to use EDCA parameters. Further, if a peer device triggers a wireless station "poorly", the wireless station may disable triggering by using an Operating Mode Indication A-Control field.

The maximum PPDU size exponent field may be 4 bits. The maximum PPDU size exponent field may specify the exponent is octets. The maximum PPDU size exponent field may limit a PPDU size as defined by equation [2]. A value of 15 may indicate that a wireless station's physical version specific capabilities limit PPDU size.

The minimum MCS rate field may be 8 bits. The minimum MCS rate field may be specified as megabytes per second. The minimum MCS rate field may define a minimum transmission rate that may be used. A value of 0 may indicate that any MCS rate may be used. Note that the Minimum MCS rate may be configured to ensure that a peer device does not drop transmission rate unnecessary low. For example, co-existence issues (e.g., from Bluetooth transmissions/interrupts) may be a reason for poor frames reception, but the peer device think that erroneous transmissions are caused by a poor link and, thus, move to lower MCS rate. However, poor (e.g., lower) MCS may result in poorer (e.g., decreased) co-existence performance because transmissions require a longer duration. Thus, by setting a minimum MCS rate, a wireless station may avoid such degradations.

The maximum TXOP duration field may be 8 bits. The maximum TXOP duration field may specify TXOP duration in increments of 25 microseconds. A value of 0 may indicate PPDU duration (e.g., TXOP duration) is not limited. The maximum TXOP duration field may define a maximum TXOP duration that a peer device may use to transmit to a wireless station. Note, in some instances, a peer device, e.g., such as AP 112, may use longer TXOPs, but limit a time that it uses to transmit to a wireless station, such as wireless station 106, within the Maximum TXOP Duration limit. Thus, AP 112 may send within a TXOP to multiple wireless stations, but limit transmissions to wireless station 106 to occur only during the specified Maximum TXOP Duration interval.

The minimum TXOP interval field may be 2 bits. The minimum TXOP interval field may specify how a peer device may continue transmission in a next TXOP. For example, a first value may indicate that transmission may be continued after EDCA TXOP obtaining. As another example, a second value may indicate that transmission may be continued after EDCA TXOP obtaining or after one or more PPDUs are addressed to other wireless stations. As a further example, a third value may indicate that transmission may be continued after EDCA TXOP obtaining or after two or more PPDUs are addressed to other wireless stations. Note that a fourth value may be reserved. Note that acknowledgement frames, if present, as well as other immediate control response frames, may not be counted as a PPDU. In some instances, the first value may correspond to a parameter value of "00", the second value may correspond to a parameter value of "01", the third value may correspond to a parameter value of "10", and the fourth value may correspond to a parameter value of "11".

Figure 18:
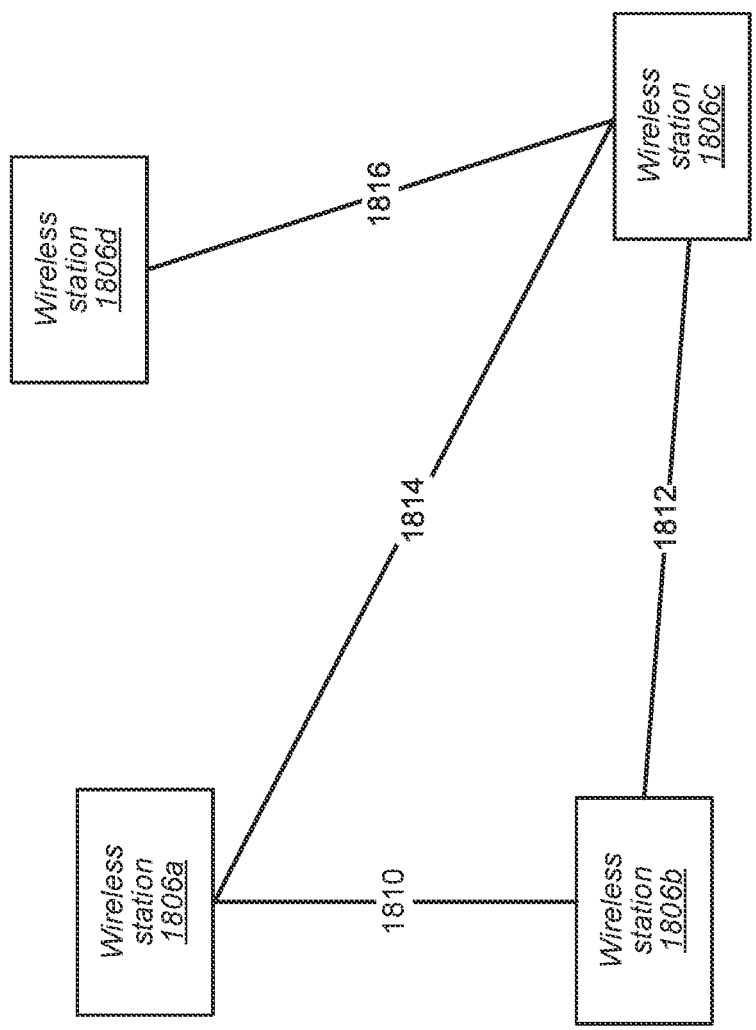
FIG. 18 illustrates an example of a NAN topology, according to some embodiments.

FIG. 18 illustrates an example of a NAN topology, according to some embodiments. As shown, wireless stations 1806*a*, 1806*b*, 1806*c*, and 1806*d* may have multiple links 1810, 1812, 1814, and 1816 between the devices in a NAN topology. According to embodiments described herein, any of wireless stations 1806*a*, 1806*b*, 1806*c*, and 1806*d* may set frame size limitations on a per link basis, e.g., by indicating frame size limitations via a management frame, a beacon frame, an association request frame, an association response frame, and/or a data frame (e.g., a QoS null frame), e.g., as described herein.

FIGS. 19, 20, 21, and 22 illustrate block diagrams of examples of methods for limiting a frame size for communications between a wireless station and a peer device, according to some embodiments. The methods shown in FIGS. 19, 20, 21, and 22 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, these methods may operate as follows.

Figure 19:
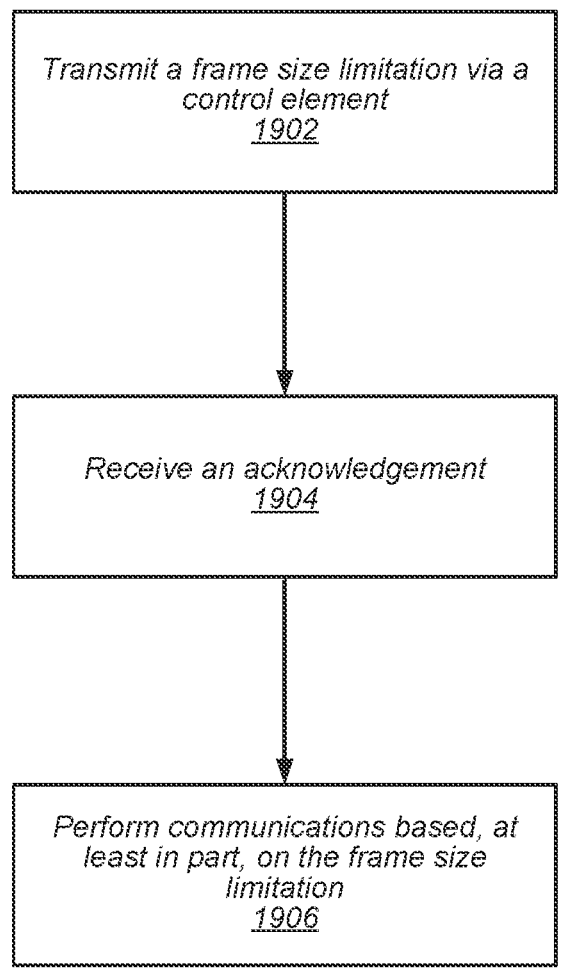
FIGS. 19, 20, 21, and 22 illustrate block diagrams of examples of methods for limiting a frame size for communications between a wireless station and a peer device, according to some embodiments.

Turning to FIG. 19, at 1902, a wireless station, such as wireless station 106, may transmit, to a peer device, which may be another wireless station 106 or an access point 112, a frame size limitation and/or an indication of a frame size limitation via a control element. In some instances, the peer device may a wireless station and/or an access point. In some instances, the control element may be included in a management frame and/or in a header of a data frame (e.g., a data frame header). In some instances, wherein the control element may be limited to 29 bits.

In some instances, the control element may include any, any combination of, and/or all of (e.g., one or more of) a request to send (RTS) needed field, a direction field, a maximum physical layer protocol data unit (PPDU) size exponent field, a minimum modulation and coding scheme (MCS) rate field, a maximum transmit opportunity (TXOP) duration field, or a minimum TXOP interval field.

In some instances, the RTS needed field may be 1 bit. The RTS needed field may indicate whether the wireless station requires the peer device to send at least one of an RTS frame, a multi-user RTS frame, or a buffer status report poll (BSRP) frame before the peer device sends a data frame or a management frame. In some instances, an RTS needed field value of 1 may indicate the wireless station requires the peer device to send at least one of an RTS frame, a multi-user RTS frame, or a BSRP frame before the peer device sends a data frame or a management frame and an RTS needed field value of 0 may indicate that at least one of an RTS frame, a multi-user RTS frame, or a BSRP frame is not required before the peer sends a data frame or a management frame. In some instances, an RTS needed field value of 0 may indicate the wireless station requires the peer device to send at least one of an RTS frame, a multi-user RTS frame, or a BSRP frame before the peer device sends a data frame or a management frame and an RTS needed field value of 1 may indicate that at least one of an RTS frame, a multi-user RTS frame, or a BSRP frame is not required before the peer sends a data frame or a management frame.

In some instances, the direction field may be 1 bit. The direction field may indicate whether settings are defined for downlink transmission or for uplink triggered transmissions. In some instances, a first value of the direction field may define that the frame size limitation control peer device transmissions to the wireless station and a second value of the direction field may define that the frame size limitation control the wireless station's transmissions that are triggered by the peer device.

In some instances, the maximum PPDU size exponent field may be 4 bits. The maximum PPDU size exponent field may specify an exponent in octets. In some instances, the maximum PPDU size exponent field limits a PPDU size as MAX PPDU Size=$2^{((6+\text{Maximum PPDU size exponent}))}$.

In some instances, the minimum MCS rate field may be 8 bits. The minimum MCS rate field may be specified as megabytes per second. In some instances, the minimum MCS rate field may define a minimum transmission rate to be used for transmissions to the wireless station. In some instances, a minimum MCS rate field value of 0 may indicate that any MCS rate may be used for transmissions to the wireless station.

In some instances, the maximum TXOP duration field may be 8 bits. The maximum TXOP duration field may specify TXOP duration in increments of 25 microseconds. In some instances, a maximum TXOP duration field value of 0 may indicate TXOP duration is not limited. In some instances, the maximum TXOP duration field may define a maximum TXOP duration that the peer device can use to transmit to the wireless station.

In some instances, the minimum TXOP interval field may be 2 bits. In some instances, the minimum TXOP interval field may specify when the peer device can continue transmission in a next TXOP. In some instances, a first value of the minimum TXOP interval field may indicate that transmission can be continued after Enhanced Distributed Channel Access (EDCA) TXOP obtaining, a second value of the minimum TXOP interval field may indicate that transmission can be continued after EDCA TXOP obtaining or after one or more PPDUs are addressed to other wireless stations, and a third value of the minimum TXOP interval field may indicate that transmission can be continued after EDCA TXOP obtaining or after two or more PPDUs are addressed to other wireless stations. Note that acknowledgement frames, if present, as well as other immediate control response frames, may not be counted as a PPDU. In some instances, the first value may correspond to a minimum TXOP interval field value of "00", the second value may correspond to a minimum TXOP interval field value of "01", and the third value may correspond to a minimum TXOP interval field value of "10".

At 1904, the wireless station may receive, from the peer device, an acknowledgement of receipt of the frame size limitation and/or an acknowledgement of receipt of the indication of the frame size limitation via the control element.

At 1906, the wireless station may perform communications with the peer device based, at least in part, on the frame size limitation.

Figure 20:
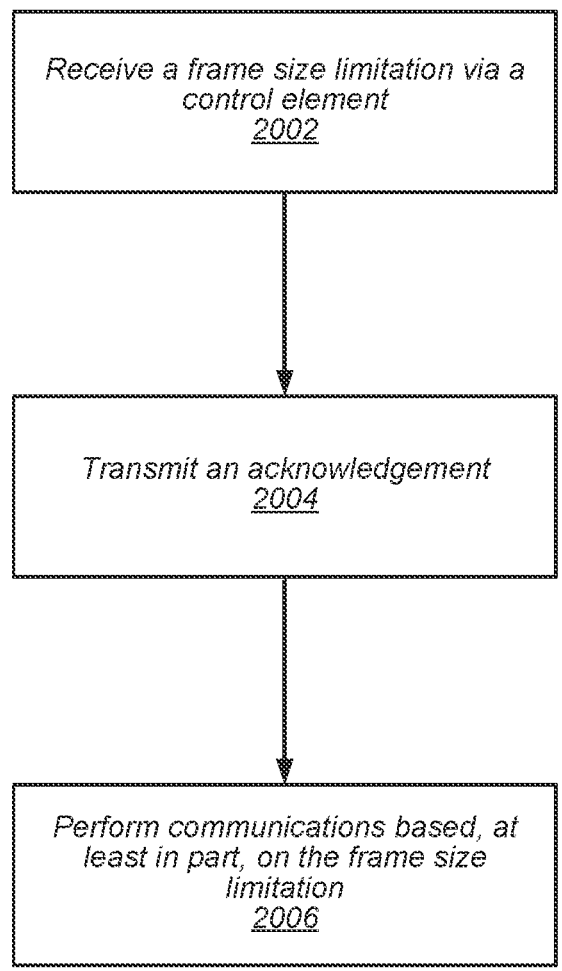

Turning to FIG. 20, at 2002, a peer device, which may be a wireless station 106 or an access point 112, may receive, from a wireless station, such as wireless station 106, a frame size limitation and/or an indication of a frame size limitation via a control element. In some instances, the peer device may a wireless station and/or an access point. In some instances, the control element may be included in a management frame and/or in a header of a data frame (e.g., a data frame header). In some instances, wherein the control element may be limited to 29 bits.

In some instances, the control element may include any, any combination of, and/or all of (e.g., one or more of) a request to send (RTS) needed field, a direction field, a maximum physical layer protocol data unit (PPDU) size exponent field, a minimum modulation and coding scheme (MCS) rate field, a maximum transmit opportunity (TXOP) duration field, or a minimum TXOP interval field.

In some instances, the RTS needed field may be 1 bit. The RTS needed field may indicate whether the wireless station requires the peer device to send at least one of an RTS frame, a multi-user RTS frame, or a buffer status report poll (BSRP) frame before the peer device sends a data frame or a management frame. In some instances, an RTS needed field value of 1 may indicate the wireless station requires the peer device to send at least one of an RTS frame, a multi-user RTS frame, or a BSRP frame before the peer device sends a data frame or a management frame and an RTS needed field value of 0 may indicate that at least one of an RTS frame, a multi-user RTS frame, or a BSRP frame is not required before the peer sends a data frame or a management frame. In some instances, an RTS needed field value of 0 may indicate the wireless station requires the peer device to send at least one of an RTS frame, a multi-user RTS frame, or a BSRP frame before the peer device sends a data frame or a management frame and an RTS needed field value of 1 may indicate that at least one of an RTS frame, a multi-user RTS frame, or a BSRP frame is not required before the peer sends a data frame or a management frame.

In some instances, the direction field may be 1 bit. The direction field may indicate whether settings are defined for downlink transmission or for uplink triggered transmissions. In some instances, a first value of the direction field may define that the frame size limitation control peer device transmissions to the wireless station and a second value of the direction field may define that the frame size limitation control the wireless station's transmissions that are triggered by the peer device.

In some instances, the maximum PPDU size exponent field may be 4 bits. The maximum PPDU size exponent field may specify an exponent in octets. In some instances, the maximum PPDU size exponent field limits a PPDU size as MAX PPDU Size=$2^{((6+\text{Maximum PPDU size exponent}))}$.

In some instances, the minimum MCS rate field may be 8 bits. The minimum MCS rate field may be specified as megabytes per second. In some instances, the minimum MCS rate field may define a minimum transmission rate to be used for transmissions to the wireless station. In some instances, a minimum MCS rate field value of 0 may indicate that any MCS rate may be used for transmissions to the wireless station.

In some instances, the maximum TXOP duration field may be 8 bits. The maximum TXOP duration field may specify TXOP duration in increments of 25 microseconds. In some instances, a maximum TXOP duration field value of 0 may indicate TXOP duration is not limited. In some instances, the maximum TXOP duration field may define a maximum TXOP duration that the peer device can use to transmit to the wireless station.

In some instances, the minimum TXOP interval field may be 2 bits. In some instances, the minimum TXOP interval field may specify when the peer device can continue transmission in a next TXOP. In some instances, a first value of the minimum TXOP interval field may indicate that transmission can be continued after Enhanced Distributed Channel Access (EDCA) TXOP obtaining, a second value of the minimum TXOP interval field may indicate that transmission can be continued after EDCA TXOP obtaining or after one or more PPDUs are addressed to other wireless stations, and a third value of the minimum TXOP interval field may indicate that transmission can be continued after EDCA TXOP obtaining or after two or more PPDUs are addressed to other wireless stations. Note that acknowledgement frames, if present, as well as other immediate control response frames, may not be counted as a PPDU. In some instances, the first value may correspond to a minimum TXOP interval field value of "00", the second value may correspond to a minimum TXOP interval field value of "01", and the third value may correspond to a minimum TXOP interval field value of "10".

At 2004, the peer device may transmit, to the wireless station, an acknowledgement of receipt of the frame size limitation and/or an acknowledgement of receipt of the indication of the frame size limitation via the control element.

At 2006, the peer device may perform communications with the wireless station based, at least in part, on the frame size limitation.

Figure 21:
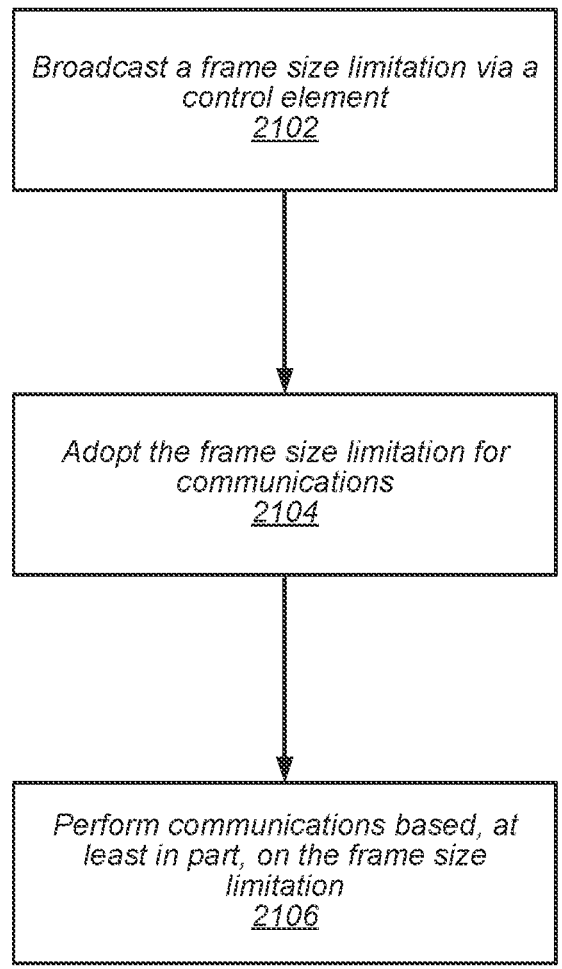

Turning to FIG. 21, at 2102, a wireless station, such as wireless station 106, may broadcast a frame size limitation and/or an indication of a frame size limitation via a control element. In some instances, the control element may be included in a management frame and/or in a header of a data frame (e.g., a data frame header). In some instances, wherein the control element may be limited to 29 bits.

In some instances, the control element may include any, any combination of, and/or all of (e.g., one or more of) a request to send (RTS) needed field, a direction field, a maximum physical layer protocol data unit (PPDU) size exponent field, a minimum modulation and coding scheme (MCS) rate field, a maximum transmit opportunity (TXOP) duration field, or a minimum TXOP interval field.

In some instances, the RTS needed field may be 1 bit. The RTS needed field may indicate whether the wireless station requires the peer device to send at least one of an RTS frame, a multi-user RTS frame, or a buffer status report poll (BSRP) frame before the peer device sends a data frame or a management frame. In some instances, an RTS needed field value of 1 may indicate the wireless station requires the peer device to send at least one of an RTS frame, a multi-user RTS frame, or a BSRP frame before the peer device sends a data frame or a management frame and an RTS needed field value of 0 may indicate that at least one of an RTS frame, a multi-user RTS frame, or a BSRP frame is not required before the peer sends a data frame or a management frame. In some instances, an RTS needed field value of 0 may indicate the wireless station requires the peer device to send at least one of an RTS frame, a multi-user RTS frame, or a BSRP frame before the peer device sends a data frame or a management frame and an RTS needed field value of 1 may indicate that at least one of an RTS frame, a multi-user RTS frame, or a BSRP frame is not required before the peer sends a data frame or a management frame.

In some instances, the direction field may be 1 bit. The direction field may indicate whether settings are defined for downlink transmission or for uplink triggered transmissions. In some instances, a first value of the direction field may define that the frame size limitation control peer device transmissions to the wireless station and a second value of the direction field may define that the frame size limitation control the wireless station's transmissions that are triggered by the peer device.

In some instances, the maximum PPDU size exponent field may be 4 bits. The maximum PPDU size exponent field may specify an exponent in octets. In some instances, the maximum PPDU size exponent field limits a PPDU size as MAX PPDU Size=$2^{((6+\text{Maximum PPDU size exponent}))}$.

In some instances, the minimum MCS rate field may be 8 bits. The minimum MCS rate field may be specified as megabytes per second. In some instances, the minimum MCS rate field may define a minimum transmission rate to be used for transmissions to the wireless station. In some instances, a minimum MCS rate field value of 0 may indicate that any MCS rate may be used for transmissions to the wireless station.

In some instances, the maximum TXOP duration field may be 8 bits. The maximum TXOP duration field may specify TXOP duration in increments of 25 microseconds. In some instances, a maximum TXOP duration field value of 0 may indicate TXOP duration is not limited. In some instances, the maximum TXOP duration field may define a maximum TXOP duration that the peer device can use to transmit to the wireless station.

In some instances, the minimum TXOP interval field may be 2 bits. In some instances, the minimum TXOP interval field may specify when the peer device can continue transmission in a next TXOP. In some instances, a first value of the minimum TXOP interval field may indicate that transmission can be continued after Enhanced Distributed Channel Access (EDCA) TXOP obtaining, a second value of the minimum TXOP interval field may indicate that transmission can be continued after EDCA TXOP obtaining or after one or more PPDUs are addressed to other wireless stations, and a third value of the minimum TXOP interval field may indicate that transmission can be continued after EDCA TXOP obtaining or after two or more PPDUs are addressed to other wireless stations. Note that acknowledgement frames, if present, as well as other immediate control response frames, may not be counted as a PPDU. In some instances, the first value may correspond to a minimum TXOP interval field value of "00", the second value may correspond to a minimum TXOP interval field value of "01", and the third value may correspond to a minimum TXOP interval field value of "10".

At 2104, the wireless station may adopt the frame size limitation for communication with peer devices. In some instances, the peer devices may wireless stations and/or an access points.

At 2106, the wireless station may perform communications with the peer device based, at least in part, on the frame size limitation.

Figure 22:
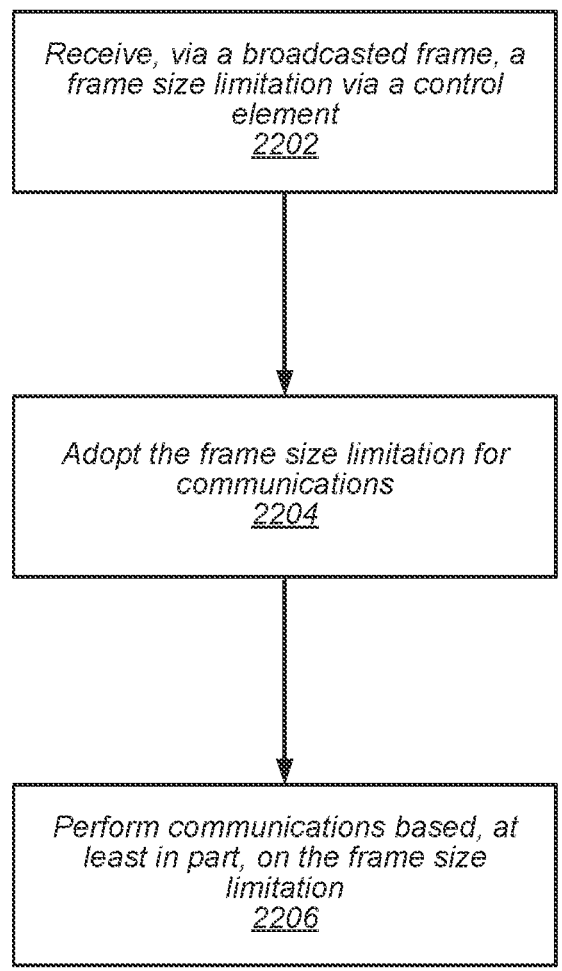

Turning to FIG. 22, at 2202, a peer device, which may be a wireless station 106 or an access point 112, may receive, from a wireless station, such as wireless station 106, a broadcast of a frame size limitation and/or an indication of a frame size limitation via a control element. In some instances, the peer device may a wireless station and/or an access point. In some instances, the control element may be included in a management frame and/or in a header of a data frame (e.g., a data frame header). In some instances, wherein the control element may be limited to 29 bits.

In some instances, the control element may include any, any combination of, and/or all of (e.g., one or more of) a request to send (RTS) needed field, a direction field, a maximum physical layer protocol data unit (PPDU) size exponent field, a minimum modulation and coding scheme (MCS) rate field, a maximum transmit opportunity (TXOP) duration field, or a minimum TXOP interval field.

In some instances, the RTS needed field may be 1 bit. The RTS needed field may indicate whether the wireless station requires the peer device to send at least one of an RTS frame, a multi-user RTS frame, or a buffer status report poll (BSRP) frame before the peer device sends a data frame or a management frame. In some instances, an RTS needed field value of 1 may indicate the wireless station requires the peer device to send at least one of an RTS frame, a multi-user RTS frame, or a BSRP frame before the peer device sends a data frame or a management frame and an RTS needed field value of 0 may indicate that at least one of an RTS frame, a multi-user RTS frame, or a BSRP frame is not required before the peer sends a data frame or a management frame. In some instances, an RTS needed field value of 0 may indicate the wireless station requires the peer device to send at least one of an RTS frame, a multi-user RTS frame, or a BSRP frame before the peer device sends a data frame or a management frame and an RTS needed field value of 1 may indicate that at least one of an RTS frame, a multi-user RTS frame, or a BSRP frame is not required before the peer sends a data frame or a management frame.

In some instances, the direction field may be 1 bit. The direction field may indicate whether settings are defined for downlink transmission or for uplink triggered transmissions. In some instances, a first value of the direction field may define that the frame size limitation control peer device transmissions to the wireless station and a second value of the direction field may define that the frame size limitation control the wireless station's transmissions that are triggered by the peer device.

In some instances, the maximum PPDU size exponent field may be 4 bits. The maximum PPDU size exponent field may specify an exponent in octets. In some instances, the maximum PPDU size exponent field limits a PPDU size as MAX PPDU Size=2^((6+Maximum PPDU size exponent)).

In some instances, the minimum MCS rate field may be 8 bits. The minimum MCS rate field may be specified as megabytes per second. In some instances, the minimum MCS rate field may define a minimum transmission rate to be used for transmissions to the wireless station. In some instances, a minimum MCS rate field value of 0 may indicate that any MCS rate may be used for transmissions to the wireless station.

In some instances, the maximum TXOP duration field may be 8 bits. The maximum TXOP duration field may specify TXOP duration in increments of 25 microseconds. In some instances, a maximum TXOP duration field value of 0 may indicate TXOP duration is not limited. In some instances, the maximum TXOP duration field may define a maximum TXOP duration that the peer device can use to transmit to the wireless station.

In some instances, the minimum TXOP interval field may be 2 bits. In some instances, the minimum TXOP interval field may specify when the peer device can continue transmission in a next TXOP. In some instances, a first value of the minimum TXOP interval field may indicate that transmission can be continued after Enhanced Distributed Channel Access (EDCA) TXOP obtaining, a second value of the minimum TXOP interval field may indicate that transmission can be continued after EDCA TXOP obtaining or after one or more PPDUs are addressed to other wireless stations, and a third value of the minimum TXOP interval field may indicate that transmission can be continued after EDCA TXOP obtaining or after two or more PPDUs are addressed to other wireless stations. Note that acknowledgement frames, if present, as well as other immediate control response frames, may not be counted as a PPDU. In some instances, the first value may correspond to a minimum TXOP interval field value of "00", the second value may correspond to a minimum TXOP interval field value of "01", and the third value may correspond to a minimum TXOP interval field value of "10".

At 2204, the peer device may adopt the frame size limitation for communication with the wireless station.

At 2206, the peer device may perform communications with the wireless station based, at least in part, on the frame size limitation.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   at least one radio communicatively coupled to the at least one antenna; and
   at least one processor in communication with the at least one radio and configured to cause the wireless station to:
     transmit, to a peer device, an indication of a frame size limitation via a control element that includes at least a maximum physical layer protocol data unit (PPDU) size exponent field or a maximum transmit opportunity (TXOP) duration field;
     receive, from the peer device, an acknowledgment; and
     perform communications with the peer device based, at least in part, on the frame size limitation.

2. The wireless station of claim 1,
   wherein the control element further includes a request to send (RTS) needed field, a direction field, a minimum modulation and coding scheme (MCS) rate field, or a minimum TXOP interval field.

3. The wireless station of claim 2,
   wherein the RTS needed field indicates whether the wireless station requires the peer device to send at least one of an RTS frame, a multi-user RTS frame, or a buffer status report poll (BSRP) frame before the peer device sends a data frame or a management frame, wherein a first RTS needed field value indicates the wireless station requires the peer device to send at least one of an RTS frame, a multi-user RTS frame, or a BSRP frame before the peer device sends a data frame or a management frame, and wherein a second RTS needed field value indicates that at least one of an RTS frame, a multi-user RTS frame, or a BSRP frame is not required before the peer device sends a data frame or a management frame.

4. The wireless station of claim 2,
   wherein the direction field indicates whether settings are defined for downlink transmission or for uplink triggered transmissions, wherein a first value of the direction field defines that the frame size limitation controls peer device transmissions to the wireless station, and wherein a second value of the direction field defines that the frame size limitation controls the wireless station's transmissions that are triggered by the peer device.

5. The wireless station of claim 2, wherein the maximum PPDU size exponent field specifies an exponent in octets, and wherein the maximum PPDU size exponent field limits a PPDU size as MAX PPDU Size=2^((6+Maximum PPDU size exponent)).

6. The wireless station of claim 2, wherein the minimum MCS rate field defines a minimum transmission rate to be used for transmissions to the wireless station.

7. The wireless station of claim 2, wherein the maximum TXOP duration field specifies a TXOP duration in increments of 25 microseconds, wherein a maximum TXOP duration field value of 0 indicates the TXOP duration is not limited, and wherein the maximum TXOP duration field defines a maximum TXOP duration that the peer device can use when transmitting to the wireless station.

8. The wireless station of claim 2, wherein the minimum TXOP interval field specifies when the peer device can continue transmission in a next TXOP, wherein a first value of the minimum TXOP interval field indicates that transmission can be continued after Enhanced Distributed Channel Access (EDCA) TXOP obtaining, wherein a second value of the minimum TXOP interval field indicates that transmission can be continued after EDCA TXOP obtaining or after one or more PPDUs are addressed to one or more other wireless stations, and wherein a third value of the minimum TXOP interval field indicates that transmission can be continued after EDCA TXOP obtaining or after two or more PPDUs are addressed to other wireless stations.

9. The wireless station of claim 1, wherein the control element is included in a management frame.

10. An apparatus, comprising:
a memory; and
at least one processor in communication with the memory and configured to:
 generate instructions to transmit, to a peer device, an indication of a frame size limitation via a control element that includes one or more of a maximum physical layer protocol data unit (PPDU) size exponent field, or a maximum transmit opportunity (TXOP) duration field;
 receive, from the peer device, an acknowledgment; and
 perform communications with the peer device based, at least in part, on the frame size limitation.

11. The apparatus of claim 10, wherein the control element is included in a data frame header.

12. The apparatus of claim 11, wherein the control element is limited to 29 bits.

13. The apparatus of claim 10, wherein the RTS needed field is 1 bit; wherein a first value of the RTS needed field indicates a requirement that the peer device is to send at least one of an RTS frame, a multi-user RTS frame, or a BSRP frame before the peer device sends a data frame or a management frame; and
wherein a second value of the RTS needed field indicates that at least one of an RTS frame, a multi-user RTS frame, or a BSRP frame is not required before the peer device sends a data frame or a management frame.

14. The apparatus of claim 10, wherein the direction field indicates whether settings are defined for transmissions from the peer device or for transmissions to the peer device.

15. The apparatus of claim 10, wherein the minimum TXOP interval field is 2 bits; wherein a minimum TXOP interval field value of "00" indicates that transmission can be continued after Enhanced Distributed Channel Access (EDCA) TXOP obtaining;
wherein a minimum TXOP interval field value of "01" indicates that transmission can be continued after EDCA TXOP obtaining or after one or more PPDUs are addressed to other peer devices; and
wherein a minimum TXOP interval field value of "10" indicates that transmission can be continued after EDCA TXOP obtaining or after two or more PPDUs are addressed to other peer devices.

16. The apparatus of claim 10, wherein the peer device is an access point.

17. A non-transitory computer readable memory medium storing instructions executable by processing circuitry of a wireless station to:
 receive, from a peer device, an indication of a frame size limitation via a control element that includes at least a maximum physical layer protocol data unit (PPDU) size exponent field or a maximum transmit opportunity (TXOP) duration field;
 transmit, to the peer device, an acknowledgment of the frame size limitation; and
 perform communications with the peer device based, at least in part, on the frame size limitation.

18. The non-transitory computer readable memory medium of claim 17, wherein the control element includes a request to send (RTS) needed field, wherein the RTS needed field is 1 bit, and wherein the RTS needed field indicates whether the wireless station requires the peer device to send at least one of an RTS frame, a multi-user RTS frame, or a buffer status report poll (BSRP) frame before the peer device sends a data frame or a management frame.

19. The non-transitory computer readable memory medium of claim 18, wherein the control element includes a direction field, wherein the direction field is 1 bit, and wherein the direction field indicates whether settings are defined for downlink transmission or for uplink triggered transmissions.

20. The non-transitory computer readable memory medium of claim 18, wherein the control element further includes a minimum modulation and coding scheme (MCS) rate field or a minimum TXOP interval field.

* * * * *